United States Patent
Schell et al.

(10) Patent No.: US 7,179,443 B2
(45) Date of Patent: Feb. 20, 2007

(54) POWDER METAL HYDRIDE HYDROGEN GENERATOR

(75) Inventors: Andreas Schell, Bloomfield Hills, MI (US); Rolf Schaller, Stuttgart (DE); Jason W Buelow, Palo Alto, CA (US); Doanh T Tran, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 324 days.

(21) Appl. No.: 10/650,893

(22) Filed: Aug. 28, 2003

(65) Prior Publication Data

US 2004/0166057 A1 Aug. 26, 2004

Related U.S. Application Data

(60) Provisional application No. 60/449,966, filed on Feb. 26, 2003.

(51) Int. Cl.
   *C01B 3/06* (2006.01)
(52) U.S. Cl. .................... 423/657; 48/61; 422/211; 422/232
(58) Field of Classification Search ............... 423/657; 422/232, 211; 48/61
   See application file for complete search history.

(56) References Cited

U.S. PATENT DOCUMENTS

| | | | | |
|---|---|---|---|---|
| 3,787,186 | A * | 1/1974 | Geres | 422/111 |
| 4,155,712 | A * | 5/1979 | Taschek | 422/239 |
| 4,463,063 | A * | 7/1984 | Adlhart | 429/19 |
| 4,950,460 | A * | 8/1990 | Goodwin et al. | 422/239 |
| 5,372,617 | A | 12/1994 | Kerrebrock et al. | |
| 5,702,491 | A * | 12/1997 | Long et al. | 48/197 R |
| 6,316,133 | B1 | 11/2001 | Bossel | |
| 6,746,496 | B1 * | 6/2004 | Kravitz et al. | 48/118.5 |
| 6,899,862 | B2 * | 5/2005 | Baldwin et al. | 423/657 |
| 2001/0022960 | A1 * | 9/2001 | Kojima et al. | 423/657 |
| 2003/0228252 | A1 * | 12/2003 | Shurtleff | 423/657 |

(Continued)

FOREIGN PATENT DOCUMENTS

EP 1170249 A1 1/2002

(Continued)

OTHER PUBLICATIONS

John H. Perry's Chemical Engineers' Handbook, Fourth Edition (1963), McGraw-Hill Book Company, pp. 7-4 and 7-5.*

*Primary Examiner*—Wayne A. Langel
(74) *Attorney, Agent, or Firm*—Ralph E. Smith

(57) ABSTRACT

A system for generating hydrogen gas for use in a fuel cell includes a powder metal hydride source, a water source, a mixing device and a catalytic hydrogen generating chamber. A method of generating hydrogen for use in a fuel cell includes the steps of: providing a source of dry metal hydride fuel; providing a source of steam; providing a mixing/reaction chamber connected to the source of dry metal hydride fuel and to the source of steam; operating the mixing/reaction chamber to transport the dry metal hydride fuel from its source to a byproduct receptacle and feeding steam into the mixing/reaction chamber such that the steam reacts with the dry metal hydride fuel to produce hydrogen gas and a dry metal powder byproduct; removing the dry metal powder byproduct from the mixing/reaction chamber; and extracting the hydrogen gas from the mixing/reaction chamber.

7 Claims, 2 Drawing Sheets

U.S. PATENT DOCUMENTS

2004/0047801 A1* 3/2004 Petillo et al. ............... 423/657

FOREIGN PATENT DOCUMENTS

| | | | |
|---|---|---|---|
| GB | 792017 A | 3/1958 | |
| JP | 54-121292 | * | 9/1979 |
| JP | 54127891 A | | 10/1979 |
| WO | WO 03084866 A2 | | 10/2003 |
| WO | WO 2004018352 A1 | | 3/2004 |

* cited by examiner

POWDER METAL HYDRIDE HYDROGEN GENERATOR

CROSS-REFERENCE TO RELATED APPLICATIONS

This application claims the benefit of U.S. Provisional Application Ser. No. 60/449,966, entitled Powder Metal Hydride Hydrogen Generator, filed Feb. 26, 2003.

STATEMENT REGARDING FEDERALLY SPONSORED RESEARCH

Not applicable.

BACKGROUND OF THE INVENTION

1. Field of the Invention

The invention relates to a method and device for generating hydrogen from a powder metal hydride and water.

2. Description of Related Art

Fuel cells are seen as having great promise for providing energy in the future in an ecologically friendly manner. Portable power systems and vehicles using fuel cells are of particular interest.

Fuel cells can use a variety of fuels, including fossil fuels and their derivatives, and hydrogen. Hydrogen is seen as having great promise due to its renewability and minimal byproducts. An infrastructure of hydrogen refueling depots, however, is not in place to service fuel cell vehicles using hydrogen as fuel. Researchers are therefore looking at ways of generating hydrogen for the fuel cell on an as-needed basis.

The generation of hydrogen through the reaction of benign compounds (i.e. compounds that are easy to store safely) has been the subject of extensive research. One such reaction involves the introduction of a slurry of water and a metal hydride such as sodium borohydride to a catalyst, resulting in the production of hydrogen. This process, while effective, has certain drawbacks. The slurry is heavy, having a poor specific energy density due to the excess of water necessary to keep the slurry in a manageable fluid form. Solids also have a tendency to precipitate out of the slurry, making for a non-homogeneous mixture, inconsistent reaction with the catalyst, and clogging of the equipment. Other disadvantages to this arrangement include the need for caustic additives to stabilize the hydrogen in the water-hydride mixture, and poor heat management of the system.

It would be advantageous to refine the water-hydride type of hydrogen generation system to overcome these disadvantages, providing a fuel with greater stability, better water utilization and heat management, and a higher specific energy density.

BRIEF SUMMARY OF THE INVENTION

A system for generating hydrogen gas for use in a fuel cell includes a powder metal hydride source, a water source, a mixing device and a catalytic hydrogen generating chamber.

A method of generating hydrogen for use in a fuel cell includes the steps of: providing a source of dry metal hydride fuel; providing a source of steam; providing a mixing/reaction chamber connected to the source of dry metal hydride fuel and to the source of steam; operating the mixing/reaction chamber to transport the dry metal hydride fuel from its source to a byproduct receptacle and feeding steam into the mixing/reaction chamber such that the steam reacts with the dry metal hydride fuel to produce hydrogen gas and a dry metal powder byproduct; removing the dry metal powder byproduct from the mixing/reaction chamber; and extracting the hydrogen gas from the mixing/reaction chamber.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
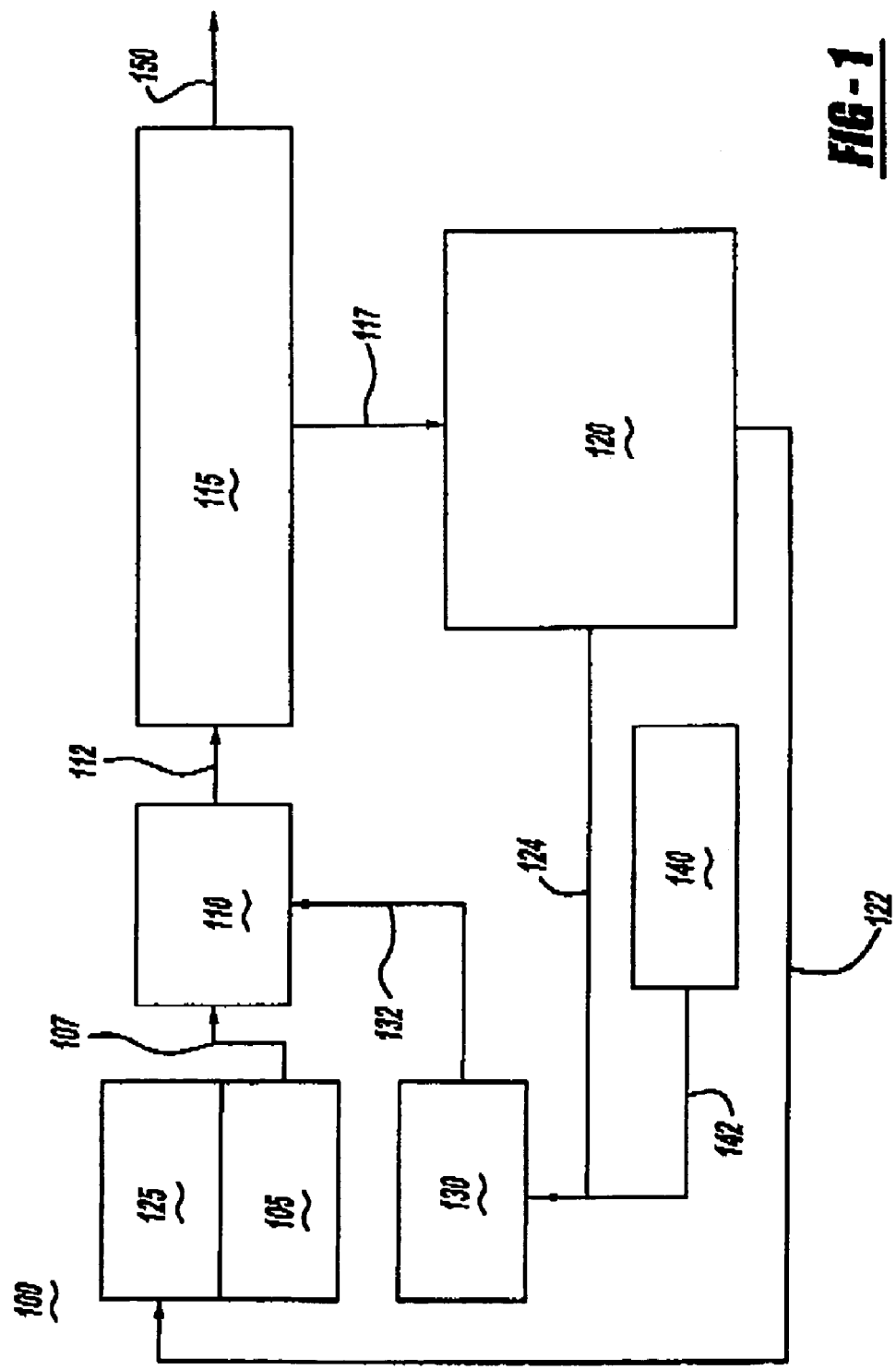
FIG. 1 is a schematic representation of a powder metal hydride hydrogen generator according to the invention.

Referring to FIG. 1, a powder metal hydride hydrogen generator 100 is schematically illustrated, and includes a powder fuel source or hopper 105 and a water source or receptacle 130. Powder fuel is transported 107 from hopper 105 to a mixing device 110. Water is transported 132 from receptacle 130 through conduit 132 to mixing device 110. Mixing device 110 can be any conventional mixer, such as a paddle mixer, or an ultrasonic mixer, for thoroughly mixing the supplied powder fuel and water.

The mixed fuel and water is then transported 112 from the mixing device 110 to a catalytic hydrogen generator 115. The generator 115 introduces the blended powder fuel and water to a catalyst for initiating the aforementioned reaction which results in the generation of hydrogen and the production of other byproducts. The hydrogen is drawn off 150 for supply, for example, to a fuel cell (not shown).

The other byproducts of the generator 115 are removed and transported 117 to a dryer/separator 120. By extracting water from the byproducts, the weight of the stored byproducts can be reduced, and the water can be recovered for further use in the system, reducing the overall quantity of water that must be stored in the system. The extracted water is therefore conducted 124 back to the water receptacle 130. The dried byproduct is transported 122 to a storage receptacle 125 for later removal or recovery. In order to reduce overall volume occupied by the system, storage receptacle 125 and hopper 105 can be incorporated into a common container with a flexible membrane separating new powder fuel from dried byproduct.

Supplemental water is conveyed 142 to the water receptacle 130 from a supplemental water source 140. A potential supplemental water source 140 is recovered water from the fuel cell.

Figure 2:
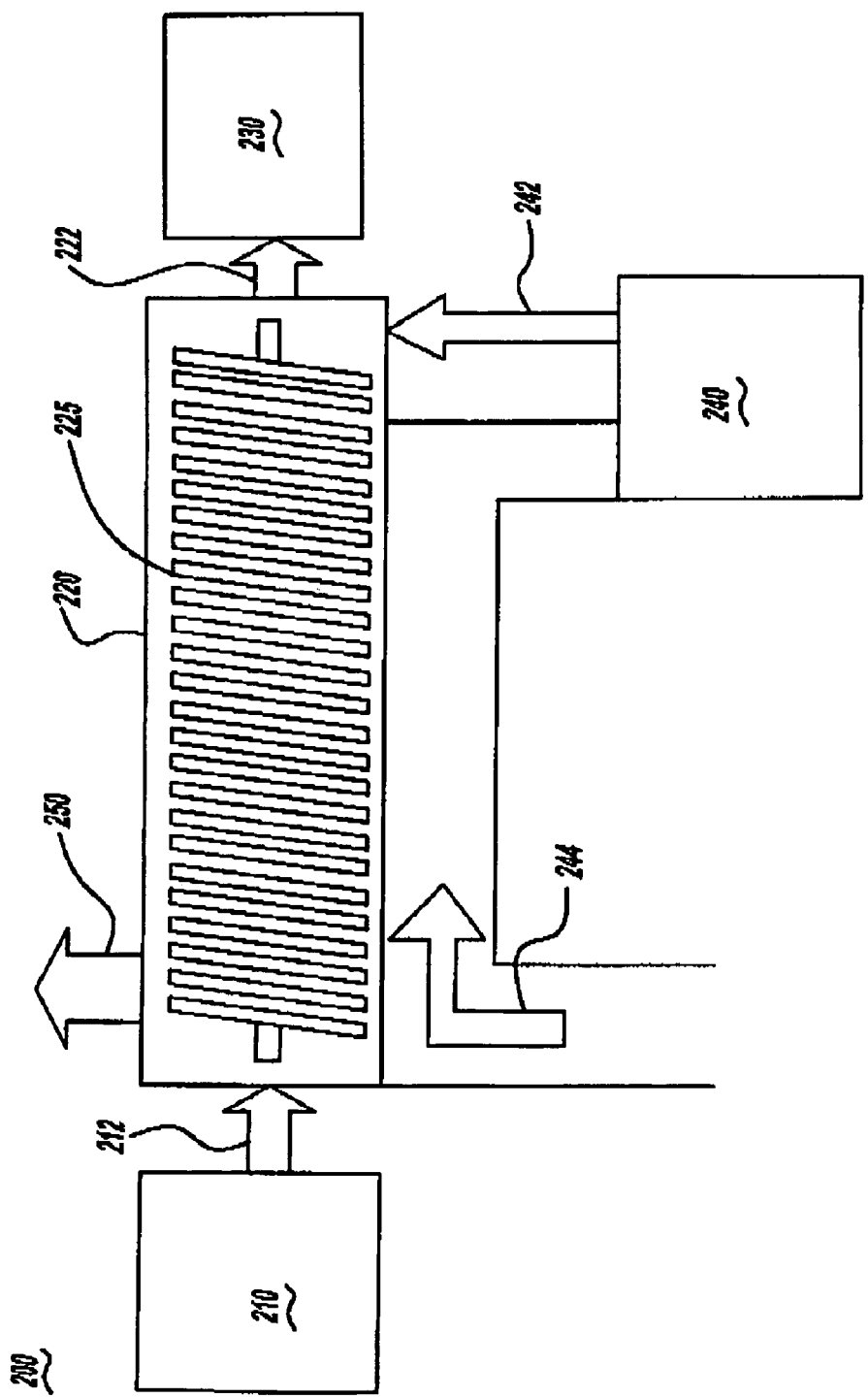
FIG. 2 is a schematic representation of a powder metal hydride hydrogen generator according to a further embodiment of the invention.

A further embodiment of an arrangement and process for generating hydrogen is shown in FIG. 2, disclosing a powder hydride and steam processing and delivery system 200. In accordance with one aspect of the present invention, the arrangement uses the heat generated by reaction process to vaporize water into steam. The steam is ported through the powder hydride and acts as a transport mechanism to push the hydrogen generation reaction forward. By using steam in combination with a powder hydride fuel source, a significantly lesser amount of water is needed as compared to a liquid hydride system, thereby reducing challenges relating to undesired precipitation of the spent hydride.

More specifically, as seen from FIG. 2, the present invention provides a mechanism for the release of hydrogen stored in a chemical hydride in loose pelletized or granular form. The hydride is transported from a storage container 210 into a mixing chamber 220. The mixing chamber 220 incorporates a longitudinal feed screw 225. In one embodiment the feed screw 225 is coated with a catalyst for accelerating the water-hydride reaction.

As the pelletized hydride is transported through the mixing chamber 220 by the screw feed 225 (from left to right in FIG. 2), a flow of steam 242 is introduced to the chamber 220 to interact with the pelletized hydride. The flow of steam 242 is generated in a heat exchanger 240. In the preferred embodiment, the heat exchanger 240 is supplied by a flow of coolant 244 drawing the heat of reaction from the mixing chamber 220, although supplemental or start-up heat energy may be required for the heat exchanger to produce steam of the proper quality for interaction with the pelletized hydride. The disclosed embodiment of FIG. 2 shows the steam being introduced in an opposing direction of flow to the pelletized hydride, but this arrangement of flow should not be considered as limiting.

As the steam reacts with the pelletized hydride, it is consumed, the water molecules and hydride reacting to form free hydrogen and pelletized byproduct. The free hydrogen is expelled 250 from the mixing chamber 220, and the pelletized byproduct is transported 222 from the mixing chamber 220 to a byproduct receptable 230. The free hydrogen is thus available for supply to the fuel cell.

The hydrogen stored in the chemical bonds of the chemical hydride can be released by mixing it with water and elevating the temperature of the mixture. This is a powerful chemical mechanism going forward and is easy to manipulate if the correct amount of water is controlled. The main challenge with the idea is the rate of hydrogen evolution. To counter this challenge, a motive force in the form of a screw drive is coated with a catalyst to speed up the reaction. On the exit side of the material flow stream, a reservoir is provided to collect the dry, spent hydride material pushed through the reaction area by the screw drive. The dry, spent fuel can then be removed and recycled off-board the vehicle. A source of heat, such an electric heater, can be used to create the needed steam at start-up of the hydrogen production.

Thus, the powder-to-powder fuel processing and delivery arrangement of the present invention advantageously allows hydrogen (within the chemical bonds of the hydride) to be stored in a non-pressurized container. The container can also store the non-reactive expended byproduct material, separated from the unexpended fuel by a flexible membrane. Accordingly, the container can be formed from a lightweight, conformable and inexpensive material.

The present invention can release hydrogen from any number of metal hydrides such as calcium hydride, lithium hydride, lithium borohydride, magnesium hydride, sodium hydride, or sodium borohydride.

In an exemplary embodiment, the system uses sodium borohydride (NaBH4) in the powder-to-powder arrangement described above to produce hydrogen for generating power through fuel cell technologies. The process of generating hydrogen from NaBH4 follows a very simple chemical reaction:

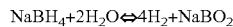

$NaBH_4 + 2H_2O \Leftrightarrow 4H_2 + NaBO_2$

The hydrogen produced is 100% pure with the possibility of some NaBO2 in the hydrogen stream.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A method of generating hydrogen for use in a fuel cell comprising the steps of:
    providing a source of dry metal hydride fuel selected from the group consisting of calcium hydride, lithium hydride, lithium borohydride, magnesium hydride, sodium hydride and sodium borohydride;
    providing a source of steam;
    providing a mixing chamber operably connected to the source of dry metal hydride fuel and the source of steam;
    transporting dry metal hydride fuel and steam into the mixing chamber to initiate a hydrogen-producing reaction;
    removing a dry metal powder byproduct from the mixing chamber, and removing hydrogen from the mixing chamber;
    wherein the mixing chamber comprises a screw drive transporter coated with a catalyst for initiating the reaction between the steam and the dry metal hydride fuel.

2. The method of claim 1 wherein the source of heat is provided by heat generated in the hydrogen-producing reaction.

3. The method of claim 1 wherein the source of steam is provided by using heat generated in the hydrogen-producing reaction to vaporize a source of water into steam.

4. A system for generating hydrogen gas for use in a fuel cell, comprising:
    a powder metal hydride source;
    a heat source arranged to vaporize a source of water into a source of steam;
    a mixing device capable of mixing the powder metal hydride and steam; and
    a catalytic hydrogen generating chamber;
    wherein the mixing device and the catalytic hydrogen generating chamber comprises a screw drive transporter coated with a catalyst, for initiating a reaction between the steam and powder metal hydride.

5. The system of claim 4 wherein the mixing device comprises a screw drive transporter connected at a first end to the powder metal hydride source and at a second end to the source of steam, wherein the screw drive is arranged to transport the powder metal hydride from the first end to the second end, and the steam is arranged to feed into the second end to pass through the powder metal hydride toward the first end such that the steam reacts with the powder metal hydride to produce hydrogen gas.

6. The system of claim 4 wherein the heat source is provided by heat generated in the catalytic hydrogen generating chamber.

7. The system of claim 4 wherein the powder metal hydride source is selected from the group consisting of calcium hydride, lithium hydride, lithium borohydride, magnesium hydride, sodium hydride and sodium borohydride.

* * * * *